US012680512B2

(12) United States Patent
Nowoisky

(10) Patent No.: US 12,680,512 B2
(45) Date of Patent: Jul. 14, 2026

(54) CONTROL SYSTEM FOR A TURBOGENERATOR AND METHOD

(71) Applicant: Rolls-Royce Deutschland Ltd & Co KG, Blankenfelde-Mahlow (DE)

(72) Inventor: Sebastian Nowoisky, Michendorf (DE)

(73) Assignee: Rolls-Royce Deutschland Ltd & Co KG, Blankenfelde-Mahlow (DE)

( * ) Notice: Subject to any disclaimer, the term of this patent is extended or adjusted under 35 U.S.C. 154(b) by 69 days.

(21) Appl. No.: 18/437,641

(22) Filed: Feb. 9, 2024

(65) Prior Publication Data

US 2024/0280060 A1 Aug. 22, 2024

(30) Foreign Application Priority Data

Feb. 16, 2023 (DE) ..................... 10 2023 103 866.4

(51) Int. Cl.
*F02C 9/28* (2006.01)
(52) U.S. Cl.
CPC .......... *F02C 9/28* (2013.01); *F05D 2220/323* (2013.01); *F05D 2270/02* (2013.01); *F05D 2270/70* (2013.01)
(58) Field of Classification Search
CPC .. F02C 9/28; F05D 2220/323; F05D 2270/02; F05D 2270/70
See application file for complete search history.

(56) References Cited

U.S. PATENT DOCUMENTS

| | | | | |
|---|---|---|---|---|
| 4,184,083 A | * | 1/1980 | Takeuchi | F02C 9/28 |
| | | | | 290/51 |
| 4,238,924 A | * | 12/1980 | Kanegae | G05D 13/62 |
| | | | | 60/39.281 |
| 5,953,902 A | | 9/1999 | Jerye | |
| 2006/0042262 A1 | * | 3/2006 | Ganev | F02C 9/28 |
| | | | | 60/773 |
| 2007/0296364 A1 | * | 12/2007 | Shoemaker | G05B 13/042 |
| | | | | 318/561 |
| 2020/0081405 A1 | * | 3/2020 | Skertic | G05B 7/02 |

FOREIGN PATENT DOCUMENTS

| | | |
|---|---|---|
| CN | 101328836 A | 12/2008 |
| CN | 105929682 A | 9/2016 |
| CN | 108181803 A | 6/2018 |
| DE | 3306889 A1 | 8/1984 |

OTHER PUBLICATIONS

German Search Report for German App. No. DE 10 2023 103 866.4 mailed Oct. 25, 2023.
Şeker, Murat, Erkan Zergeroğlu, and Enver Tatlicioğlu. "Non-linear control of variable-speed wind turbines with permanent magnet synchronous generators: a robust backstepping approach." International Journal of Systems Science 47.2 (2016): 420-432.

* cited by examiner

*Primary Examiner* — Andrew J Cromer
(74) *Attorney, Agent, or Firm* — Lempia Summerfield Katz LLC

(57) ABSTRACT

An open-loop control system for a turbogenerator includes a closed-loop speed control module having: an input; a plurality of closed-loop controllers each configured to output an open-loop control signal based on a speed signal applied to the input; and an output. The closed-loop speed control module is configured to generate an output signal based on the speed signal from one or more of the open-loop control signals of the plurality of closed-loop controllers and to output a same signal at the output.

17 Claims, 6 Drawing Sheets

CONTROL SYSTEM FOR A
TURBOGENERATOR AND METHOD

The present patent document claims the benefit of German Patent Application No. 10 2023 103 866.4, filed Feb. 16, 2023, which is hereby incorporated by reference in its entirety.

TECHNICAL FIELD

The present disclosure relates to an open-loop control system for a turbogenerator, to a turbogenerator having such an open-loop control system, to an aircraft having such a turbogenerator, and to a method for open-loop control of a turbogenerator.

BACKGROUND

Aircraft are propelled by various design concepts. Internal combustion engines, (e.g., piston engines or gas turbine engines), allow long ranges and high speeds. Drives having one or a plurality of electric motor(s) enable the use of sustainably generated energy and are in some cases particularly low-maintenance and quiet but may have a limited range. Hybrid electrically driven aircraft may combine the advantages of combustion engines with the advantages of electric drives.

It is conceivable, for example, to supply current to an electric motor of a thrust-generating and/or lift-generating drive unit by a turbogenerator, either throughout the entire operation or only in certain situations, (e.g., when a battery charge falls below a predetermined threshold), or in certain operating conditions, (e.g., when the aircraft is starting up).

However, the settling times of the various modules of a turbogenerator, (e.g., a gas turbine and a generator), is a difficulty in turbogenerators. Gas turbines may undergo closed-loop thrust control in a manner based on characteristic maps. The settling time of a set speed may be several seconds (e.g., 5 to 8 seconds). The electric generator, on the other hand, may have settling times in the range of milliseconds. The electrical system at a higher level either adapts to the settling time of the gas turbine or the required energy is accordingly obtained from another quickly available source, for example, a supercap or a battery. Both options are not satisfactory for many applications.

SUMMARY AND DESCRIPTION

It is an object of the present disclosure to improve a current supply by a turbogenerator. The scope of the present disclosure is defined solely by the appended claims and is not affected to any degree by the statements within this summary. The present embodiments may obviate one or more of the drawbacks or limitations in the related art.

One aspect specifies an open-loop control system for a turbogenerator, wherein the open-loop control system includes a closed-loop speed control module having: an input; a plurality of closed-loop controllers each configured to output an open-loop control signal based on a speed signal applied to the input; and an output. The closed-loop speed control module is configured to generate an output signal based on the speed signal from one or more of the open-loop control signals of the plurality of closed-loop controllers and to output same at the output.

This enables a non-linear closed-loop control strategy, which allows various operating points to be set particularly precisely and quickly. This enables the turbogenerator, which is subjected to closed-loop control by the open-loop control system, to follow rapidly varying loads, especially during various flight maneuvers, and to adjust a respective speed quickly and very precisely in the process. This may significantly improve the current supply by way of the turbogenerator. Negative effects such as long settling times and significant overshooting may be prevented.

The speed signal is indicative of a current speed of the turbogenerator. The speed signal may be a measured value of a speed sensor, such as a phonic wheel, or the result of a voltage or current analysis of an open-loop generator controller of the turbogenerator. The speed signal may be analogue or digital, for example, in the form of a current or voltage or in the form of a numerical figure.

The individual closed-loop controllers may be assigned to different speed ranges. For example, depending on the speed signal, the closed-loop speed control module selects one closed-loop controller or a subset of the plurality of closed-loop controllers and uses the open-loop control signal(s) thereof to generate the output signal.

The plurality of closed-loop controllers may be set differently, for example, different components (for example P, I, D) and/or components with different gains. Each closed-loop controller may thus be optimized for a particular operating point and provide linear closed-loop control at the operating point. The plurality of closed-loop controllers may have different structures, for example, in one case as a PID controller and in another case as a pure P controller. For example, in the case of a closed-loop controller, $K_i$ and $K_d$ may be parameterized so that the corresponding component in the closed-loop control result is 0. The plurality of closed-loop controllers may also be different in terms of their form. For example, the I component may be limited by an anti-wind-up device. This may prevent integration if a control difference arises (setpoint-actual value). This means that the one closed-loop controller is able to react quickly and, for example, prevent a numerical calculation error if the control result should leave the numerical range.

In specific terms, for example, at least one respective P component, I component, or D component of at least two of the plurality of closed-loop controllers may be set differently.

For example, the closed-loop speed control module has one or more weighting blocks. The closed-loop speed control module may be configured to use the one or more weighting blocks to weight the open-loop control signals of one closed-loop controller, a subset of closed-loop controllers, or all of the closed-loop controllers, in particular to weight them differently, for example, based on the speed signal. This makes it possible to provide a good continuous transition between closed-loop controllers acting in adjacent speed ranges.

At least one closed-loop controller may be the most weighted at a given speed. This speed may be between the speeds of the respective strongest weighting of two other closed-loop controllers. That closed-loop controller may have a greater P component than the two closed-loop controllers adjacent to it in terms of speed. This enables a speed range with strong resonants to be traversed quickly. Alternatively, that closed-loop controller may have a lower P component than the two closed-loop controllers adjacent to it in terms of speed. This enables the turbomachine to be kept at a certain speed particularly effectively.

The closed-loop speed control module may include an adder configured to add open-loop control signals, in particular the weighted open-loop control signals, from one of the closed-loop controllers, a subgroup of the closed-loop controllers, or all of the closed-loop controllers in order to generate the output signal. This enables a particularly good transition between the closed-loop controllers.

The weighting blocks may each have a speed-dependent weighting function. Provision may be made for the sum across all weighting functions at each speed value to be 1 or a maximum of 1. Precise closed-loop control may thus be achieved across the entire speed range subjected to closed-loop control. At least two of the weighting functions may be of different design. For example, at least two of the weighting functions have a different compression.

The closed-loop speed control module may be configured to activate different closed-loop controllers under different conditions, for example, when the speed increases and when the speed decreases (for example, at the same speed). This enables the respective different conditions to be taken into account.

The speed signal is indicative of a speed of the turbogenerator. Each of the closed-loop controllers may have a closed-loop controller input to which a difference between the speed signal and a setpoint speed signal is applied. The setpoint speed signal is based, for example, on a thrust request entered at an interface (for example, by a pilot).

The open-loop control system may be configured to limit a gradient of a power request. A superordinate limitation of a target specification makes it possible to improve the stability of the turbogenerator and electric machines. Here, for example, in a hybrid open-loop controller, a request from the pilot is filtered via an interface.

The open-loop control system may further include a closed-loop thrust control module include configured to obtain the output signal of the closed-loop speed control module and, on the basis thereof, to output an open-loop control signal for a fuel valve. This enables the turbogenerator to be set quickly and precisely to the required power output.

One aspect specifies a turbogenerator, in particular, for an aircraft. The turbogenerator includes the open-loop control system according to any configuration described herein. In terms of the advantages, reference is made to the above information relating to the open-loop control system.

The turbogenerator may include a gas turbine, a generator driven by the gas turbine, and, optionally, a rectifier supplied with electric current by the generator. This enables a DC link to be supplied with current, in which, for example, a battery may also be connected.

One aspect specifies an aircraft that includes the turbogenerator according to any configuration described herein. The aircraft may further include a drive unit that generates thrust and/or lift by an electric motor. Provision may be made for the electric motor to be electrically coupled to the turbogenerator in order to be supplied with electric current thereby, in particular via the DC link. This enables a large range to be achieved with the turbogenerator subjected to efficient closed-loop control.

The aircraft may include an open-loop hybrid controller configured to detect whether (or not) the aircraft includes a battery by which the electric motor is electrically coupled in order to be supplied with electric current thereby. Alternatively, or additionally, the open-loop hybrid controller may be configured to detect a property of a (for example the aforementioned) battery of the aircraft. In this case, the open-loop hybrid controller may be configured to subject the open-loop control system to open-loop control based on the detected battery and/or the detected property of the battery. The property of the battery may be a capacity, a current state of charge, or a maximum current that may be provided by the battery. This enables the open-loop hybrid controller to automatically deliver an overall optimized power.

The aircraft may also include at least one electrical battery. In this case, the electric motor may (also) be electrically coupled to the battery in order to be supplied with electric current thereby, in particular via the DC link. This enables regenerative energy to be used. Additionally, there is the possibility of recuperation in various flight situations, for example, when the electric motor of the drive unit is operated as a generator.

One aspect specifies a method for open-loop control of a turbogenerator, in particular the turbogenerator according to any configuration described herein. The method includes: applying a speed signal to an input of a closed-loop speed control module; outputting, by each controller of a plurality of closed-loop controllers of the closed-loop speed control module, an open-loop control signal based on the speed signal applied to the input; using the closed-loop speed control module to generate an output signal from one or more of the control signals of the plurality of closed-loop controllers based on the speed signal; and outputting the output signal at the output. In terms of the advantages, reference is made to the above information relating to the open-loop control system and to the turbogenerator.

One aspect specifies a non-volatile storage medium including instructions which, when carried out by one or more processors of an open-loop control system for a turbogenerator (in particular the open-loop control system according to any configuration described herein), cause the open-loop control system to carry out the method described above. In terms of the advantages, reference is made to the above information relating to the method.

BRIEF DESCRIPTION OF THE DRAWINGS

Exemplary embodiments are described with reference to the figures, in which, in schematic illustrations.

DETAILED DESCRIPTION

Figures 1, 2:
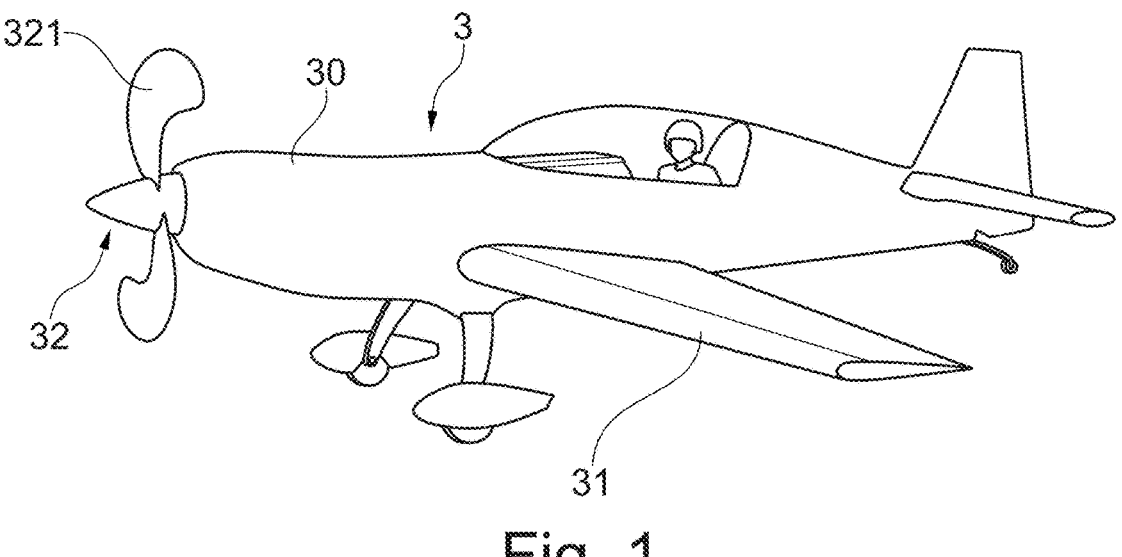
FIG. 1 depicts an example of an aircraft in the form of an airplane having an electrically driven rotor unit.
FIG. 2 depicts an example of a turbogenerator of the aircraft according to FIG. 1 and an open-loop control system of the turbogenerator.

FIG. 1 shows an aircraft 3 in the form of a hybrid electrically driven airplane having a fuselage 30 and wings 31.

The aircraft 3 includes a drive unit 32 having a rotor unit having a plurality of rotor blades 321, which is driven by an electric motor 320 of the drive unit 32. The rotor unit includes a plurality of rotor blades 321, (e.g., two rotor blades). The rotor blades 321 in the example shown are mounted on a hub, thus forming a propeller. In alternative embodiments, the aircraft 3 may include a fan instead of a propeller, and/or may include multiple drive systems each having at least one propeller, fan, or the like. In certain examples, the aircraft 3 may include a plurality of drive units and/or a plurality of rotor units, (e.g., propellers), instead of only exactly one drive unit 32 with exactly one propeller. In certain examples, the aircraft 3 may have any shape and that the drive unit(s) 32 may be arranged, for example, on the fuselage 30, on wings 31, and/or at other locations.

In order to supply an electric motor of the drive unit 32 with electric current, the aircraft 2 includes a turbogenerator 2 illustrated in FIG. 2 and an open-loop control system 1 that subjects the turbogenerator 2 to open-loop control.

The turbogenerator 2 includes a gas turbine 20, a generator 21, a rectifier 22, and an open-loop generator controller 23.

FIG. 2 only schematically illustrates the gas turbine 20, which has a compressor 201 in which incoming air is compressed and supplied to a combustion chamber 202. The combustion chamber 202 burns the compressed air that is mixed with a fuel. The resulting hot combustion gases drive a turbine 203. The turbine 203 is fixedly connected to a shaft 204 that is therefore set in rotation by the rotation of the turbine 203. The compressor 201 is fixedly connected to a compressor shaft 207 that may be driven by a starter 200. A compressor turbine is provided to drive the compressor shaft 207 during operation.

In order to introduce a corresponding amount of fuel into the gas turbine 20, depending on the power requirement, the gas turbine 20 also includes a settable fuel valve 205. The fuel valve 205 enables a mass flow, a volume flow, and/or a valve position to be set.

In addition, the gas turbine 20 includes a speed sensor 206. The speed sensor is designed in the present case, for example, as a phonic wheel and delivers a speed signal that indicates a speed $n_{FPT}$ of the turbine 203. The abbreviation FPT here stands for "free power turbine," and so the turbine 203 may be rotated relative to the compressor 201. This enables particularly precise setting of a particular speed of the turbine 203.

The shaft 204 drives a rotor 211 of the generator 21 relative to a stator 210 of the generator 21. As a result, the generator 21 generates an electric current, in the present case, in the form of a (three-phase) alternating current. This alternating current is converted into a direct current by the rectifier 22.

The open-loop generator controller 23 controls the rectifier 22, and optionally also components of the generator 21. In particular, the open-loop generator controller 23 controls the voltage supplied by the rectifier 22 and/or the current supplied by the rectifier 22. In the example shown, the open-loop generator controller 23 is also configured to output a speed signal that, in the form of a synthetic speed signal, indicates a speed $n_{Syn\_FPT}$ of the rotor 211 of the generator 21 and thus of the turbine 203. This speed signal may be determined by the open-loop generator controller 23 based on a measured motor current and/or based on a measured motor voltage (e.g., the zero crossing of the sine wave of the current or of the voltage of the generator is determined and the time constant is determined). Within the scope of the measurement accuracy, $n_{Syn\_FPT} = n_{FPT}$. Provision may be made for both speed signals to be generated and communicated to the open-loop control system 1 and processed by the open-loop control system 1 or an upstream unit, for example, to be averaged (in a weighted or unweighted manner). As an alternative, provision may be made for only one of the two speed signals to be generated and communicated to the open-loop control system 1. In all cases, the open-loop control system 1 receives a speed signal which, in analogue or digital form, indicates the speed of the turbine 203.

The open-loop control system 1 also receives a setpoint speed signal that indicates a setpoint for the speed of the turbine 203. The setpoint speed is generated, for example, by a thrust request from a pilot.

The open-loop control system 1 includes a closed-loop speed control module 10 and a closed-loop thrust control module 11.

The closed-loop speed control module 10 includes: an input 100A, a plurality of closed-loop controllers 101, explained in more detail below in connection with FIG. 3, each of which is configured to output an open-loop control signal based on the speed signal applied to the input 100A; and an output 102. The closed-loop speed control module 10 is set up in this case to generate an output signal based on the speed signal from one or more of the open-loop control signals of the plurality of closed-loop controllers 101 and to output same at the output 102. The output signal may indicate a value of a thrust, or alternatively a power or a current of the generator 21, for example.

The speed signal may be present in the form of an analogue or digital specification of a speed. Furthermore, the closed-loop speed control module 10 may also carry out the closed-loop control on the basis of the voltage of the generator 21 (AC) as a measured and corresponding comparison variable. For example, the setpoint speed is converted by a rule (for example, a conversion formula or a look-up table).

The closed-loop speed control module 10 has a further input 100B to which the setpoint speed signal is applied.

The output signal, which is output at the output of the closed-loop speed control module 10, is entered at an input of the closed-loop thrust control module 11. The closed-loop thrust control module 11 sets an actuator of the gas turbine 20 (for open-loop control of the gas turbine 20), (e.g., the fuel valve 205), based on the output signal of the closed-loop speed control module 10. Optionally, the closed-loop thrust control module 11 receives from the open-loop generator controller 23 signals that indicate a power $P_{Gen}$ generated by the generator 21 and/or a current $I_{Gen}$ supplied by the generator 21 (and/or a voltage $U_{Gen}$ supplied by the generator 21). $P = U*I$ holds true in the DC part and $P = U*I*\cos phi$ holds true in the AC part. One advantage of supplying current and voltage is that it is more precise because the same values of the line may be present for different pairings of these values. Furthermore, the closed-loop thrust control module 11 receives signals which indicate a setpoint power $P_{soll}$, which is to be generated by the generator 21 and/or a setpoint current $I_{soll}$, which is to be supplied by the generator 21. One or more of these signals may be evaluated by the closed-loop thrust control module in order to adjust the fuel valve 205. The fuel valve 205 may be operated by way of an actuation method (e.g., dither generator) to prevent stick-slip effects and/or a PWM actuation method. It is also conceivable for there to be feedthrough through the closed-loop speed control module 10, in particular to quickly regulate rapid speed fluctuations.

Figures 3, 4:
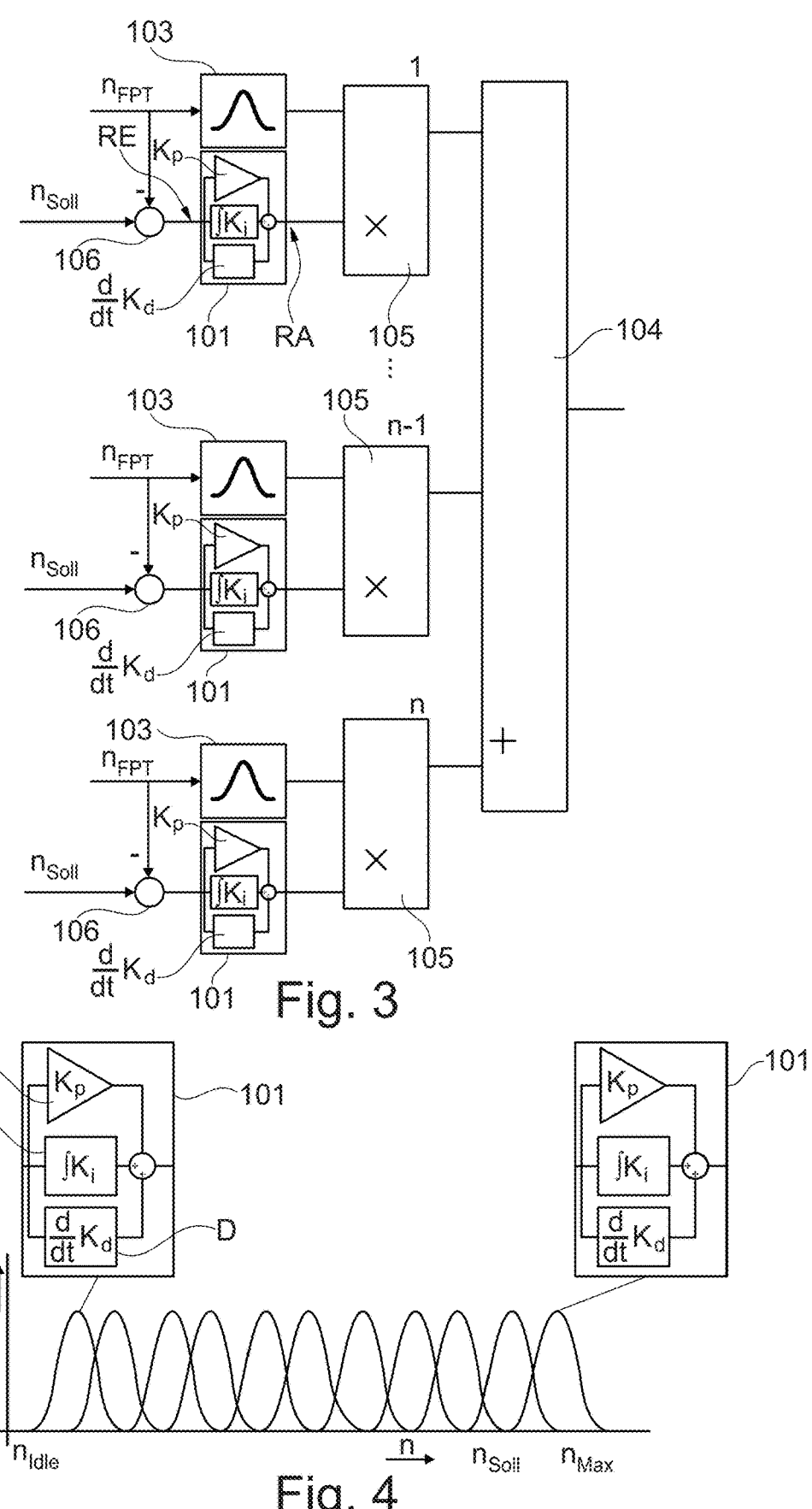
FIG. 3 depicts an example of components of a closed-loop speed control module of the open-loop control system according to FIG. 2.
FIG. 4 depicts a graph for illustrating an example of a weighting of a respective contribution of a plurality of closed-loop controllers of the closed-loop speed control module according to FIG. 3.

FIG. 3 shows the plurality of closed-loop controllers 101 of the closed-loop speed control module 10. In the example of FIG. 3, specifically 3 (or, in general, n) closed-loop controllers 101 are shown, but a larger number of closed-loop controllers 101 is also conceivable, (e.g., more than 10 closed-loop controllers). A cascade of n closed-loop controllers may thus be used. Each controller of the closed-loop controllers 101, (two of which are also shown somewhat larger in FIG. 4), includes a P element, an I element, and a D element. However, it would also be conceivable for one or more of the closed-loop controllers to include only one P element, only one I element, or only one D element, or any two such elements. The PID closed-loop controller may also be configured structurally, for example, by an anti-wind-up device that may be used to achieve a numerical limitation of the closed-loop controller output and thus a more dynamic closed-loop controller structure. The influence on fluctuating closed-loop control differences may be reduced by limiting the output signal of the D component. Each closed-loop controller 101 receives a difference between the speed signal (e.g., the current speed of the turbine 205) and the setpoint speed signal (e.g., the setpoint value of the speed of the turbine 205) at a respective closed-loop controller input RE. The difference is calculated by a subtractor 106. Based on this difference, the P element, the I element, and the D element each provide an individual manipulated value. These individual manipulated values are added to a manipulated value and output as a manipulated value signal at a closed-loop controller output RA of the respective closed-loop controller 101. This is done in parallel for all closed-loop controllers 101.

A weighting block 103 is assigned to each closed-loop controller 101. The speed signal is supplied to each of the weighting blocks 103. Each weighting block 103 stores a weighting function, which assigns a weighting to each speed. For example, the weighting is between 0 and 1. If a speed signal is supplied to the weighting block 103, then this outputs a weighting signal that indicates the weighting corresponding to the speed of the speed signal. Any continuous function may be used as a weighting function. A triangle, rectangle, Hanning, Hamming, or Blackman window function or a Gaussian distribution function is expediently used.

The weighting of the weighting signal is multiplied by the manipulated value of the manipulated value signal in a multiplier 105. This is done in parallel for all closed-loop controllers 101. The weighted manipulated values of the individual closed-loop controllers 101 are added to the output signal in an adder 104, wherein the signal is then output at the output 102.

As explained in more detail below, the plurality of closed-loop controllers is set differently in comparison to one another. The different closed-loop controllers 101 thus provide different manipulated values for the same entered speed difference from one other. Specifically, at least one respective P component, I component, and/or D component of the plurality of closed-loop controllers 101 is set differently.

FIG. 4 shows, for example, speed-dependent weighting values h(n) in a range of speeds n from an idle speed $n_{Idle}$ via an exemplary setpoint speed $n_{Soll}$ up to a maximum speed $n_{Max}$. Several weighting functions are shown here, each of which is designed by way of example in the form of a Hamming window function. Each weighting function thus has a range in which it makes a contribution, and in the other ranges of the speed is equal to 0 or essentially equal to 0. Each of the weighting functions, which in the example of FIG. 4 are formed equally and arranged equidistantly with one another, is stored in a weighting block 103. Thus, the individual closed-loop controllers 101 are only activated in certain speed ranges. The individual closed-loop controllers 101 are therefore assigned to different speed ranges.

In the specific design according to FIG. 4, the weighting functions are evenly distributed across the entire speed range. However, it is also conceivable that certain (in particular predetermined) ranges, (e.g., the setpoint speed range), are resolved more finely, that is to say the weighting functions may be compressed or stretched in terms of width. The total result of the weighting functions is not more than 1 in this case.

A PI controller 101 may be used at the idle speed $n_{Idle}$, at which the D component is deactivated. Simple P controllers 101 may be used in the speed range between $n_{Idle}$ and $n_{Soll}$, in which the D and I components are deactivated. The P components may vary for the individual closed-loop controllers 101. A PI controller or a PID controller 101 may be used for the setpoint speed $n_{Soll}$.

Figure 5:
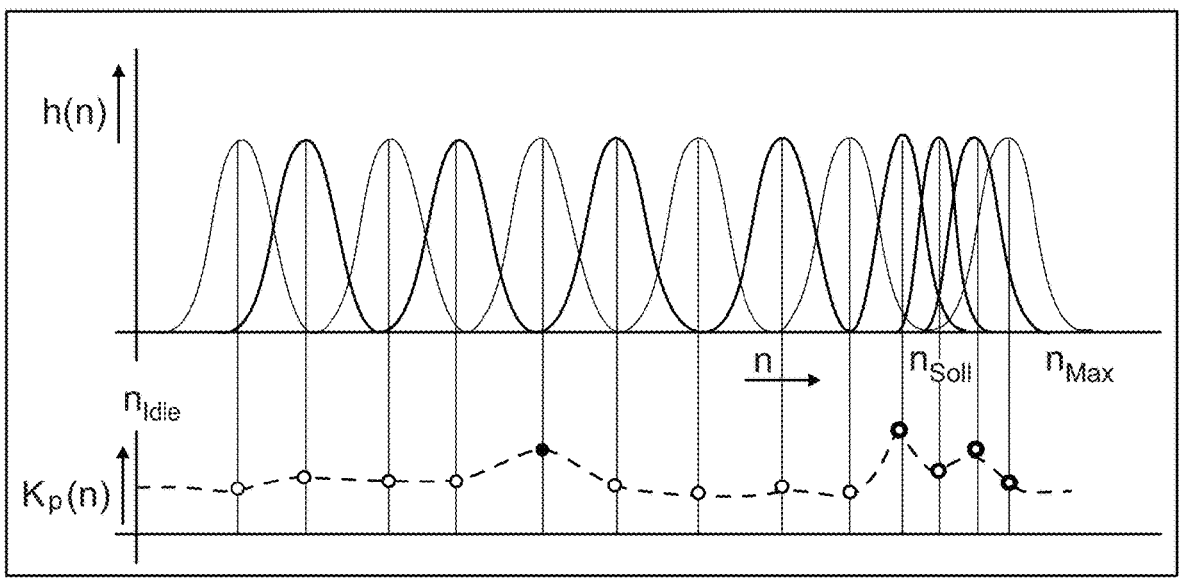
FIG. 5 depicts a graph for illustrating an example of another possible weighting of a respective contribution of a plurality of closed-loop controllers of the closed-loop speed control module according to FIG. 3 and a respective P controller component.

The top graph of FIG. 5, corresponding to FIG. 4, shows weighting functions which in this case are partly different from one another, however. For example, the weighting functions in the range of the setpoint speed $n_{Soll}$ thus have a smaller width than in areas located further away. This enables a finer adjustment in the range of the setpoint speed to be achieved.

Furthermore, a bottom graph shows the gain $K_p$ of the P element P of the respectively associated closed-loop controller 101. As may be seen, the gains $K_p$ of the individual closed-loop controllers 101 are set differently and have different magnitudes. In the present case, for example, an increased gain $K_p$ is provided in a medium speed range in order to be able to pass through a resonance range quickly when starting up the turbogenerator 2. In addition, increased gains $K_p$ are provided on both sides of the setpoint speed in order to keep the setpoint speed precise.

Different types of weighting functions are conceivable, (e.g., also triangle windows, Hanning functions, rectangular functions, or generally window functions). At each speed, the sum of the weighting functions results in 1. Optionally, if the maximum speed is exceeded, the output signal may be set to 0 in order to enable fast downward adjustment.

In this way, adapted closed-loop control parameters may be provided for each operating point. This enables improved closed-loop control quality to be achieved. In addition, linearization may be achieved at the respective operating point. Furthermore, for example, very large, manipulated variables are made possible in lower speed ranges and more moderate manipulated variables in upper speed ranges in order on the one hand to quickly adjust to a target speed and, on the other hand, to achieve a high control quality.

Figure 6:
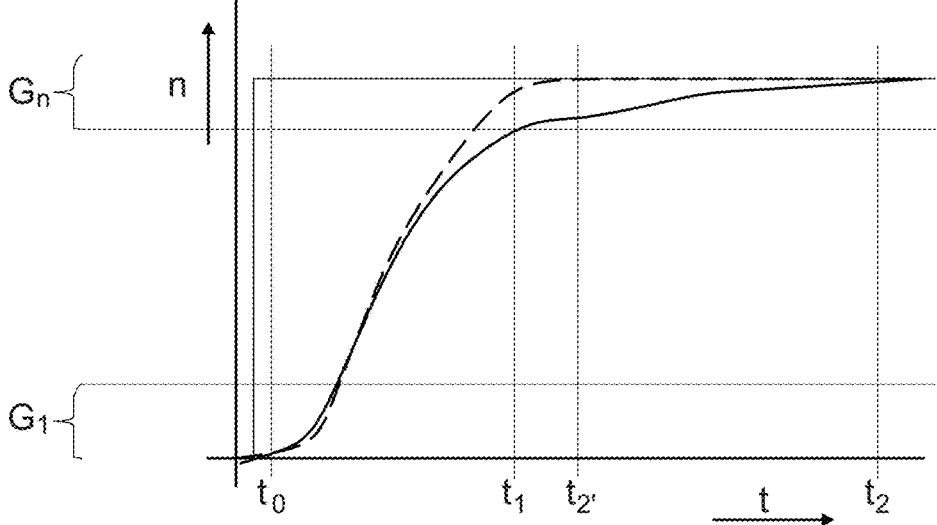
FIG. 6 depicts a graph for illustrating an example of differences between different closed-loop control concepts.

FIG. 6 illustrates the profile of a start-up of the turbogenerator 2 to a desired speed against the time t. In this case, a speed request is illustrated by a thin line. This request is followed by the controlled speed n. A dashed line here illustrates an exemplary path with the closed-loop control described herein in comparison with conventional closed-loop control (solid line).

The speed change request is made at time $t_0$. The gas turbine 20 reaches 95% of the requested speed (e.g., 5 to 8 seconds) at time $t_1$. The gas turbine adjusts the remaining 5% under conventional closed-loop control at time $t_2$, which, however, requires 2 to 3 times the reaction time. In comparison, the closed-loop control proposed here may adjust the remaining 5% within 1 to 2 seconds ($t_2'$).

Figure 7:
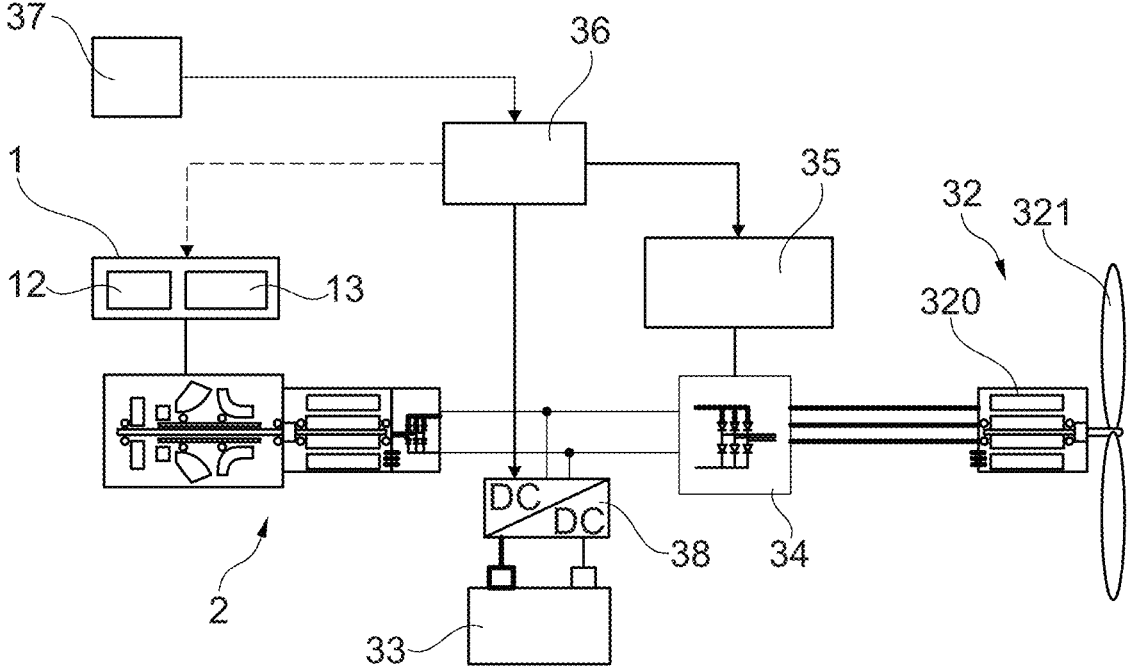
FIG. 7 depicts an example of a hybrid electric drive system of the aircraft according to FIG. 1.

FIG. 7 shows the hybrid electric drive system of the aircraft 2. This includes the turbogenerator 2 (where here the turbine is arranged at a distance from the generator purely by way of example) and the open-loop control system 1. In addition, the hybrid electric drive system includes the aforementioned drive unit 32.

In addition to the propeller with the rotor blades 321, the drive unit includes an electric motor 320 that drives the propeller. The electric motor 320 is supplied with current by an inverter 34, more precisely with (e.g., three-phase) alternating current. The inverter 34 draws current from the rectifier 22 of the turbogenerator 2, as well as from a battery 33 connected in parallel therewith, via a DC link. In this case, the battery 33 is connected to the DC link via a DC/DC converter 38. An open-loop inverter controller 35 controls the inverter 34. In this case, an open-loop hybrid controller 36 is provided, which control commands via an interface 37, for example, entered by a pilot. The open-loop control commands may include a requested thrust.

The open-loop hybrid controller 36 then controls the open-loop control system 1 of the turbogenerator 2, the DC/DC converter 38, and the open-loop inverter controller 35 so that the drive unit 32 generates the requested thrust. In this case, the open-loop hybrid controller 36 signals the setpoint speed, the setpoint power, and/or the setpoint current to the open-loop control system 1.

Figure 8:
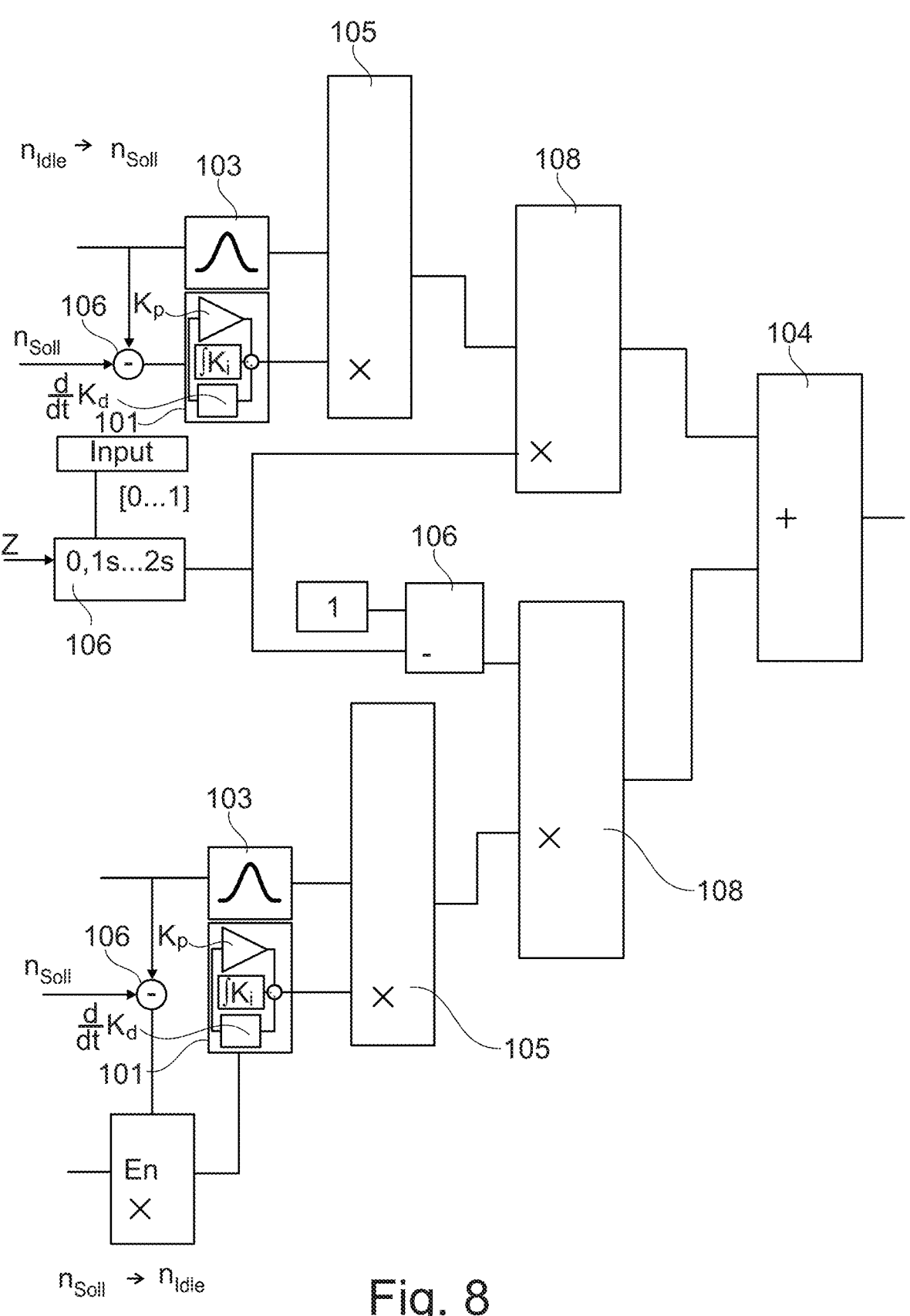
FIG. 8 depicts an example of a closed-loop control process that differentiates between increasing and decreasing speed.

FIG. 8 illustrates an optional configuration according to which, under certain conditions, it is possible to select from different closed-loop controllers 101, (e.g., for the same speed range), optionally even with identical weighting functions. In the example shown here, a distinction is made between a speed increase (top) and a speed decrease (bottom). An input value (Input, which may also be referred to as scaling input) may optionally only assume the binary states 0 and 1 and is generated, for example, at the interface 37 (for example, based on pilot inputs, such as the thrust). This logic signal is used to indicate which case of speed increase or speed decrease currently applies. An optional additional scaling function 107 (for example, ramp function) generates an ascending or descending linear ramp from the binary signal. The scaling function 107 optionally uses an input which specifies a time period Z of the ramp, for example, 1 second. The scaling value provided by the scaling function 107 (is similar to the weighting function and) may be any value between 0 and 1. The output of the multiplier 108 of one closed-loop controller 101 is thus multiplied by a further multiplier 105 by a first multiplication value of the scaling function 107 (with a value in a range of 0 to 1). The output of the multiplier 105 of the other closed-loop controller 101 is multiplied by a further multiplier 108 by a second multiplication value (namely an inverse scaling value) obtained by subtracting the first multiplication value from 1. The scaling value and the inverse scaling value form a sum of 1 (by the described calculation rule) at any time. As a result, both closed-loop controller results from the multipliers 105 for the states "speed increase" and "speed decrease" may be continuously merged into one another. The two results are added together in an adder 104. The two closed-loop controllers 101 are set differently. In this way, different closed-loop control may be achieved in a simple way depending on the situation.

For example, a state detection process generates a logic signal that initiates the speed increase or the speed decrease. It is also conceivable to determine the time period Z depending on an operating state. For example, in a first operating state (e.g., normal operation), the time period Z is set to a first value (e.g., 2 seconds) and a (e.g., different) second operating state (e.g., an emergency) is set to a (e.g., different) second value (e.g., 0.1 second). Additional input variables which characterize the flight state may be used for this purpose.

It is thus possible (e.g., using the scaling function 107) to switch over between both situations (e.g., the speed increase and speed decrease), whereby a time period of the transition (in which the multiplication values change from 0 to 1 or from 1 to 0) may be settable. Both systems may thus be transferred continuously without generating a jump discontinuity in the manipulated signal.

Optionally, another selectable closed-loop controller 101 according to FIG. 8 is provided for each closed-loop controller 101 according to FIG. 3. With an optional input En in an optional multiplier (enable block 109), a signal that is input may be used to selectively deactivate a closed-loop controller 101, for example, in one or more predetermined states. Such an enable signal may optionally also be enabled by a ramp function (scaling function 107) in order to establish the manipulated signal from the closed-loop controller 101 within a time span of, for example, 0.3 seconds and thus cause no jump discontinuities. As an alternative, the output of the subtractor 106 may be passed directly to the closed-loop controller 101.

Figure 9:
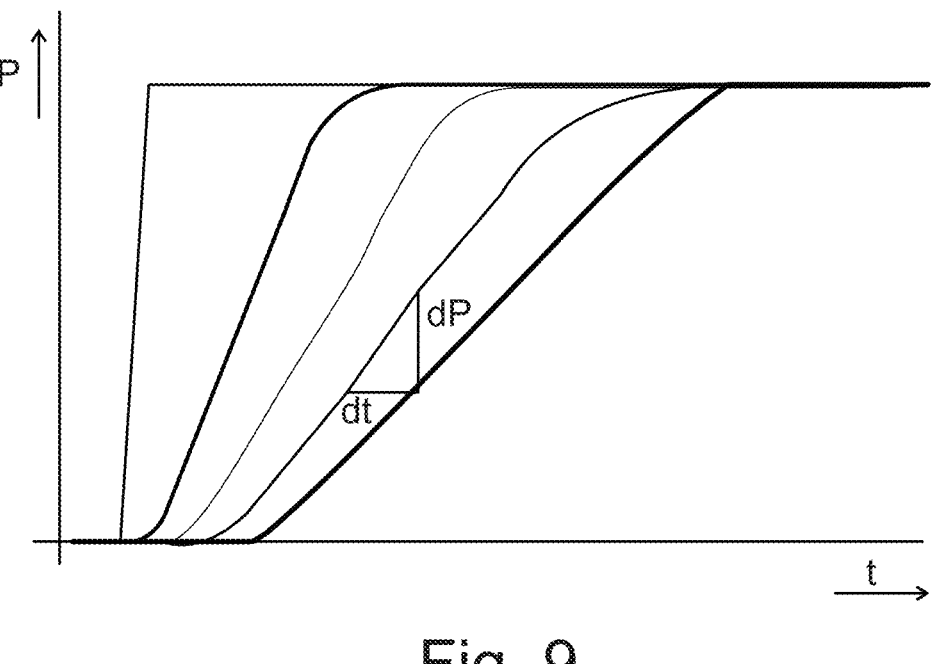
FIG. 9 depicts a graph for illustrating an example of power provision with different availabilities of an additional battery.

FIG. 9 shows a characteristic map that may be used in the open-loop hybrid controller 36 to set the power of the drive unit 32 and to draw the required energy from the turbogenerator 2 and optionally the battery 33. For this purpose, the power request of the pilot is configured to the hybrid electrical system by a gradient limitation. The required power specification is thus converted via an a-priori defined power increment per unit of time. By way of example, the pilot request is to change the power from 200 kW to 600 kW within 300 milliseconds. This is now converted, for example, into 100 kW per 500 milliseconds. For example, the power is set here as required by the flight application for all flight maneuvers and/or in an emergency. FIG. 9 shows a request by a pilot on the far left. To the right, the two outer, thicker curves (left) illustrate an upper control limit and (right) a lower control limit. Depending on whether or not a battery is connected, or whether it has a high or a low state of charge, the open-loop hybrid controller 36 may adjust a rise in power dP/dt to be greater (with the battery charged) or lower. Optionally, the open-loop hybrid controller 36 automatically detects whether a battery is connected and whether it is sufficiently charged and/or other battery characteristics. Instead of limiting a rate of change in the power, it is also conceivable to limit the rate of change in the current dI/dt. The open-loop hybrid controller 36 limits the power retrieval of the electric machines based on the pilot's requests, the specification of the components used in the hybrid drive system, and the respective flight situation.

Figure 10:
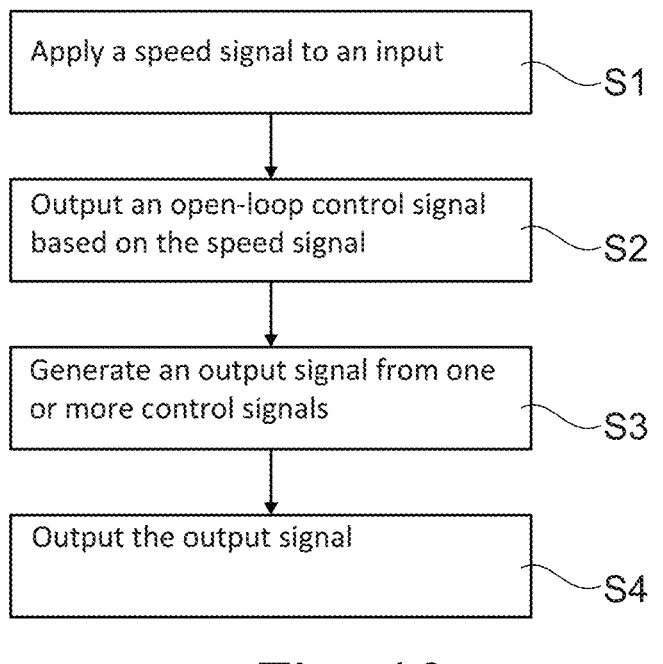
FIG. 10 depicts an example of a method for open-loop control of a turbogenerator.

FIG. 10 illustrates a method for open-loop control of a turbogenerator, in particular the turbogenerator 2 described above. The method includes the following acts.

In act S1, the method includes applying a speed signal to an input 100A of a closed-loop speed control module 10.

In act S2, the method includes outputting, by each controller of a plurality of closed-loop controllers 101 of the closed-loop speed control module 10, an open-loop
control signal based on the speed signal applied to the
input 100A.

In act S3, the method includes using the closed-loop speed
control module 10 to generate an output signal from
one or more of the control signals of the plurality of
closed-loop controllers 101 based on the speed signal.

In act S4, the method includes outputting the output signal
at the output 102.

As illustrated in FIG. 7, the open-loop control system 1
includes a non-volatile storage medium 12 including instruc-
tions that, when carried out by one or more processors 13 of
the open-loop control system 1 of the turbogenerator 2,
cause the open-loop control system 1 to carry out the method
described above.

It is understood that the disclosure is not restricted to the
embodiments described above, and various modifications
and improvements may be made without departing from the
concepts described herein. It is furthermore to be noted that
any of the features described may be used separately or in
combination with any other features, provided that they are
not mutually exclusive. The disclosure extends to and
includes all combinations and sub-combinations of one or
more features which are described here. If ranges are
defined, these ranges therefore include all the values within
these ranges as well as all the partial ranges that lie within
a range.

It is to be understood that the elements and features
recited in the appended claims may be combined in different
ways to produce new claims that likewise fall within the
scope of the present disclosure. Thus, whereas the dependent
claims appended below depend on only a single independent
or dependent claim, it is to be understood that these depen-
dent claims may, alternatively, be made to depend in the
alternative from any preceding or following claim, whether
independent or dependent, and that such new combinations
are to be understood as forming a part of the present
specification.

LIST OF REFERENCE SIGNS

1 Open-loop control system
10 Closed-loop speed control module
100A, 100B Input
101 Closed-loop controller
102 Output
103 Weighting block
104 Adder
105 Multiplier
106 Subtractor
107 Scaling function
108 Multiplier
109 Enable block
11 Closed-loop thrust control module
12 Storage medium
13 Processor
2 Turbogenerator
20 Gas turbine
200 Starter
201 Compressor
202 Combustion chamber
203 Turbine
204 Shaft
205 Fuel valve
206 Speed sensor
207 Compressor shaft
21 Generator

210 Stator
211 Rotor
22 Rectifier
23 Open-loop generator controller
3 Aircraft
30 Fuselage
31 Wing
32 Drive unit
320 Electric motor
321 Rotor blade
33 Battery
34 Inverter
35 Open-loop inverter controller
36 Open-loop hybrid controller
37 Interface
38 DC/DC converter
D D element
I I element
P P element
RA Closed-loop controller output
RE Closed-loop controller input
Z Time period

The invention claimed is:

1. An open-loop control system for a turbogenerator, the
open-loop control system comprising:
a closed-loop speed controller having:
an input;
a plurality of closed-loop controllers arranged in par-
allel, wherein each closed-loop controller of the
plurality of closed-loop controllers is set differently,
and wherein each closed-loop controller of the plu-
rality of closed-loop controllers is configured to
output a different open-loop control signal based on
a speed signal applied to the input; and
an output,
wherein the closed-loop speed controller is configured
to select one or more open-loop control signals of the
open-loop control signals of the plurality of closed-
loop controllers depending on the speed signal and
generate an output signal using the selected one or
more open-loop control signals of the open-loop
control signals of the plurality of closed-loop con-
trollers, and
wherein the closed-loop speed controller is configured
to output the output signal at the output; and
a closed-loop thrust controller configured to receive the
output signal of the closed-loop speed controller,
wherein the closed-loop thrust controller is configured to
output an open-loop control signal based on the output
signal to adjust a fuel valve to the turbogenerator.

2. The open-loop control system of claim 1, wherein each
closed-loop controller of the plurality of closed-loop con-
trollers is assigned to a different speed range, and
wherein the one or more open-loop control signals are
selected by the closed-loop controller based on the
speed signal and the respective speed ranges of the
plurality of closed-loop controllers.

3. The open-loop control system of claim 1, wherein at
least one respective P component, I component, or D com-
ponent of the plurality of closed-loop controllers is set
differently.

4. The open-loop control system of claim 3, wherein the
closed-loop speed controller further comprises one or more
weighting blocks configured to weight each open-loop con-
trol signal of the plurality of closed-loop controllers differ-
ently based on the speed signal.

5. The open-loop control system of claim 4, wherein a closed-loop controller of the plurality of closed-loop controllers that is most strongly weighted at a speed between speeds of the respectively strongest weighting of two further closed-loop controllers of the plurality of closed-loop controllers has a greater P component than two closed-loop controllers adjacent to the closed-loop controller in terms of speed or a smaller P component than the two closed-loop controllers adjacent to the closed-loop controller in terms of speed.

6. The open-loop control system of claim 4, wherein the closed-loop speed controller is configured to add the weighted open-loop control signals in order to generate the output signal.

7. The open-loop control system of claim 4, wherein each weighting block of the one or more weighting blocks has a speed-dependent weighting function, and wherein a sum across all of the weighting functions at each speed value results is 1 or has a maximum of 1.

8. The open-loop control system of claim 1, wherein the closed-loop speed controller further comprises one or more weighting blocks configured to weight each open-loop control signal of the plurality of closed-loop controllers differently based on the speed signal.

9. The open-loop control system of claim 1, wherein the closed-loop speed controller is configured to activate different closed-loop controllers of the plurality of closed-loop controllers at increasing speed and at decreasing speed.

10. The open-loop control system of claim 1, wherein the speed signal is indicative of a speed of the turbogenerator, and wherein each closed-loop controller of the plurality of closed-loop controllers has a closed-loop controller input to which a difference between the speed signal and a setpoint speed signal is applied.

11. The open-loop control system of claim 1, wherein the open-loop control system is configured to limit a gradient of a power request.

12. A turbogenerator for an aircraft, the turbogenerator comprising:

an open-loop control system having:
a closed-loop speed controller, wherein the closed-loop speed controller comprises:
an input;
a plurality of closed-loop controllers arranged in parallel, wherein each closed-loop controller of the plurality of closed-loop controllers is set differently, and wherein each closed-loop controller of the plurality of closed-loop controllers is configured to output a different open-loop control signal based on a speed signal applied to the input; and
an output,
wherein the closed-loop speed controller is configured to select one or more open-loop control signals of the open-loop control signals of the plurality of closed-loop controllers depending on the speed signal and generate an output signal using the selected one or more open-loop control signals of the open-loop control signals of the plurality of closed-loop controllers, and
wherein the closed-loop speed controller is configured to output the output signal at the output; and
a closed-loop thrust controller configured to receive the output signal of the closed-loop speed controller,

wherein the closed-loop thrust controller is configured to output an open-loop control signal based on the output signal to adjust a fuel valve to the turbogenerator.

13. The turbogenerator of claim 12, further comprising:

a gas turbine;

a generator configured to be driven by the gas turbine; and a rectifier configured to be supplied with electric current by the generator.

14. An aircraft comprising:

a fuel valve;

a turbogenerator; and an electric motor configured to generate thrust and/or lift, wherein the electric motor is electrically coupled to the turbogenerator and supplied with electric current from the turbogenerator, wherein the turbogenerator comprises:
an open-loop control system having:
a closed-loop speed controller comprising:
an input;
a plurality of closed-loop controllers arranged in parallel, wherein each closed-loop controller of the plurality of closed-loop controllers is set differently, and wherein each closed-loop controller of the plurality of closed-loop controllers is configured to output a different open-loop control signal based on a speed signal applied to the input; and
an output,
wherein the closed-loop speed controller is configured to select one or more open-loop control signals of the open-loop control signals of the plurality of closed-loop controllers depending on the speed signal and generate an output signal using the selected one or more open-loop control signals of the open-loop control signals of the plurality of closed-loop controllers, and
wherein the closed-loop speed controller is configured to output the output signal at the output; and
a closed-loop thrust controller configured to receive the output signal of the closed-loop speed controller,
wherein the closed-loop thrust controller is configured to output an open-loop control signal based on the output signal to adjust the fuel valve to the turbogenerator.

15. The aircraft of claim 14, wherein the aircraft is configured to: detect whether the aircraft comprises a battery by which the electric motor is electrically coupled in order to be supplied with electric current thereby and/or to detect a property of the battery of the aircraft, and subject the open-loop control system to open-loop control based on the battery and/or the property of the battery.

16. The aircraft of claim 14, further comprising:

a battery, wherein the electric motor is electrically coupled to the battery in order to be supplied with electric current from the battery.

17. A method for open-loop control of a turbogenerator, the method comprising:

applying a speed signal to an input of a closed-loop speed controller of an open-loop control system of the turbogenerator;

outputting, by each closed-loop controller of a plurality of closed-loop controllers of the closed-loop speed controller, a different open-loop control signal based on the speed signal applied to the input of the closed-loop speed controller, wherein each closed-loop controller of the plurality of closed-loop controllers is set differently, and wherein closed-loop controllers of the plurality of closed-loop controllers are arranged in parallel;

selecting, by the closed-loop speed controller, one or more open-loop control signals of the open-loop control signals of the plurality of closed-loop controllers depending on the speed signal;

generating, by the closed-loop speed controller, an output signal using the selected one or more open-loop control signals of the open-loop control signals of the plurality of closed-loop controllers;

outputting the output signal at an output of the closed-loop speed controller;

receiving, by a closed-loop thrust controller, the output signal from the closed-loop speed controller; and outputting, by the closed-loop thrust controller, an open-loop control signal based on the output signal to adjust a fuel valve to the turbogenerator.

* * * * *